Aug. 2, 1955  N. WARMOLTZ ET AL  2,714,680
RADIATION COUNTER TUBE
Filed June 13, 1951
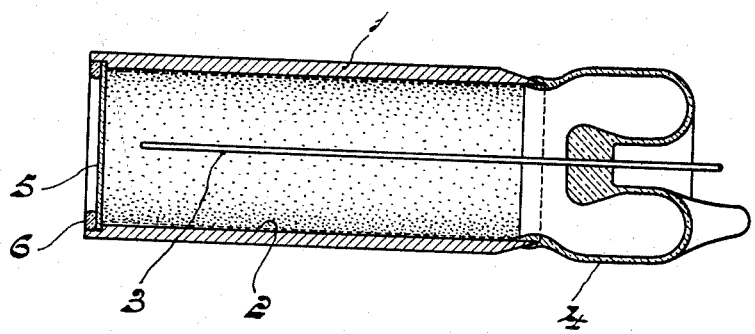
INVENTORS
NICOLAAS WARMOLTZ
GERHART WOLFGANG RATHENAU
BY
AGENT United States Patent Office 2,714,680
Patented Aug. 2, 1955

2,714,680

RADIATION COUNTER TUBE

Nicolaas Warmoltz and Gerhart Wolfgang Rathenau, Eindhoven, Netherlands, assignors to Hartford National Bank and Trust Company, Hartford, Conn., as trustee Application June 13, 1951, Serial No. 231,302

Claims priority, application Netherlands June 23, 1950

6 Claims. (Cl. 313—93)

This invention relates to radiation counter tubes, the gas-filling of which contains a constituent which acts to quench the discharge.

This constituent exercises a great influence on the characteristic curve of the tube, especially in the interval within which, in the case of variation of the voltage the sensitivity of the counter tube does not substantially vary which interval will be referred to hereinafter as "the plateau." The wider and flatter this plateau, the better. A plateau width of 200 volts and a variation of sensitivity over this interval of not more than some few percent per 100 volts is to be looked upon as favourable.

Satisfactory results in this respect can be obtained with the use of definite hydrocarbon compounds and also with the use of halogens. However, counter tubes containing such gases have the disadvantage that their characteristic curve is in time adversely affected. With tubes having a hydrocarbon compound this is due to dissociation of this compound by the electric discharge and with tubes containing halogen it is due to chemical reaction of the quenching gas with the metal of which the electrodes are made, with the result that the quenching gas is absorbed.

The influence of this absorption can be reduced by previously causing the parts by which the tube is constituted to remain for some time in an atmosphere of the quenching gas to be used so that these parts are, as it were, saturated with this gas. However, this method has the disadvantage that when the temperature of the tube increases, halogen is released, with the result that the slope and width of the plateau vary. Thus, for example, in a tube the electrodes of which were saturated with bromine, the operating voltage (lower limit of the plateau) was consequently displaced from 275 to 360 volts.

The invention enables halogen to be used as a quenching gas, the above-mentioned disadvantages being mitigated.

According to the invention, a radiation counter tube containing an ionisable gas and an admixture of halogen is characterized in that the total or a considerable part of the total surface area of the metal parts of the tube in contact with said mixture is made of chromium sesquioxide.

Chromium sesquioxide reacts with the halogen to a limited extent such that the decrease of the amount of quenching gas is sufficiently slow. The characteristic curve of a counter tube according to the invention is substantially constant. Since there is no necessity for allowing for the absorption of the halogen, the percentage of halogen may be chosen according to the desired operating voltage.

If a single metal part which constitutes a small part of the total surface area in contact with the gas mixture or a small part of a further metal part is not provided with a chromium sesquioxide surface, the quality of the tube is not adversely affected. Thus, for example, it is not necessary to provide the anode with a chromium sesquioxide surface if it is constituted by a metal wire or a thin rod arranged coaxially with a cylindrical cathode. In contradistinction thereto, it is suitable to give the cathode a surface of chromium sesquioxide, since it constitutes a considerable part of the total surface area of the metal parts in contact with the gaseous mixture. Also in the case of other metal parts having a comparatively large surface area, for example, the partition sometimes contained in radiation counter tubes, the provision of a chromium sesquioxide surface affords an important improvement.

The above-mentioned disadvantages of the halogens were particularly apparent with chlorine. For this reason, the use of halogen as an extinction gas was limited in practice to bromine although chlorine yields better results as far as the electrical properties of the tube are concerned. With the use of the invention, the improved results due to the use of chlorine may be obtained.

Chlorine has the additional advantage of rendering the tube suitable for a wider temperature range. Its vapour pressure remains still high enough when the temperature falls below the value at which the vapour pressure of bromine becomes insufficient for satisfactory operation.

A counter tube according to the invention may contain, for example, a gas mixture under a pressure of 10 millimetres of mercury which is constituted primarily by neon and/or argon and for a small part by some tenths of a per cent of chlorine or bromine.

In order that the invention may be more clearly understood and readily carried into effect, it will now be described more fully with reference to the accompanying diagrammatic drawing, given by way of example, showing one embodiment of a counter tube according to the invention.

Referring now to the figure, a cathode 1, which is shaped in the form of a hollow cylinder and which forms part of the outer wall of a radiation counter tube is provided on the inner surface with a continuous protective layer 2 of chromium sesquioxide. A rod-like anode 3, which is arranged coaxially with the cathode may also be provided with a chromium sesquioxide surface but this is of little importance, because it has a very small surface area compared with the cathode. The layer of chromium sesquioxide keeps the metal by which the coated electrode is otherwise constituted (for example copper) from contact with the gas with which the tube is filled.

The electrodes may alternatively be made of an alloy containing chromium. If the chromium is alloyed with one or more metals which oxidise at a higher oxygen pressure than chromium, a protective layer may be obtained by preferential oxidation. In this process, the conditions of oxidation will be such that the chromium alone oxidises, to chromium sesquioxide, and the other component or components of the alloy do not. An alloy suitable in this respect is constituted mainly by iron and chromium in a weight ratio of 1:0.25 to 40. Such an alloy has the additional advantage that the glass sealing member 4 can readily be sealed hermetically to the electrodes.

As an alternative, the electrodes may first be chromium-plated and at least the surface of the chromium layer may then be oxidised to chromium sesquioxide.

The desired extent of oxidation depends on the gas used. If the extinction gas is to be constituted by chlorine, more care should be taken than when it is to be constituted by bromine.

Bromine gas requires more complete oxidation than iodine gas which, however, is not so suitable as a quenching gas as bromine.

The window 5 through which the radiation to be examined enters the tube may be formed by mica. It is secured hermetically to the cylinder 2 by means of a ring 6 formed by melting of pulverulent glass.

What we claim is:

1. A radiation counter tube comprising an envelope, a pair of electrodes within said envelope, each of said electrodes having a metal surface portion which absorbs a halogen, an ionizable gaseous medium within said envelope containing a halogen gas, and a coating comprising chromium sesquioxide over a major portion of the metal surfaces of said electrodes.

2. A radiation counter tube comprising an envelope, a pair of electrodes within said envelope, each of said electrodes having a metal surface portion which absorbs a halogen, an ionizable gaseous medium within said envelope containing chlorine, and a coating comprising chromium sesquioxide over a major portion of the metal surfaces of said electrodes.

3. A radiation counter tube comprising an envelope, a pair of electrodes within said envelope, the larger of said electrodes being constituted by an alloy of chromium and iron, an ionizable gaseous medium within said envelope containing a halogen gas, and a coating of chromium sesquioxide over the surface of said larger electrode.

4. A radiation counter tube comprising an envelope, a mica window in said envelope, a pair of electrodes within said envelope, each of said electrodes being constituted by an alloy of chromium and iron, an ionizable gaseous medium within said envelope containing chlorine, and a coating of chromium sesquioxide over a major portion of the surfaces of said electrodes.

5. A radiation counter tube comprising an envelope, a mica window powder-glass sealed in said envelope, a pair of electrodes one of which constitutes a wall of said envelope, said one electrode being constituted by an alloy of chromium and iron, an ionizable gaseous medium within said envelope containing chlorine, and a coating of chromium sesquioxide over the entire surface of said one electrode.

6. A radiation counter tube comprising an envelope, a pair of electrodes within said envelope, one of said electrodes being substantially larger than the other and having a metal surface portion which absorbs a halogen, an ionizable gaseous medium within said envelope containing a halogen, and a coating comprising chromium sesquioxide over the surface of said larger electrode.

References Cited in the file of this patent

UNITED STATES PATENTS

| | | |
|---|---|---|
| 2,457,781 | Metten et al. | Dec. 28, 1948 |
| 2,552,723 | Koury | May 15, 1951 |
| 2,571,700 | Ford | Oct. 15, 1951 |